(12) United States Patent
Morgan

(10) Patent No.: US 7,176,265 B2
(45) Date of Patent: Feb. 13, 2007

(54) DIRECTLY POLYMERIZED LOW MOLECULAR WEIGHT GRANULAR POLYTETRAFLUOROETHYLENE

(75) Inventor: Richard A. Morgan, Vienna, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 79 days.

(21) Appl. No.: 10/685,789

(22) Filed: Oct. 15, 2003

(65) Prior Publication Data

US 2005/0182216 A1 Aug. 18, 2005

Related U.S. Application Data

(60) Provisional application No. 60/428,343, filed on Nov. 22, 2002.

(51) Int. Cl.
*C08F 214/26* (2006.01)

(52) U.S. Cl. .................. 526/89; 525/199; 526/242; 526/250

(58) Field of Classification Search ............ 526/89, 526/242, 250; 525/199
See application file for complete search history.

(56) References Cited

U.S. PATENT DOCUMENTS

| | | | |
|---|---|---|---|
| 3,105,824 A | | 10/1963 | Green et al. |
| 3,245,972 A | | 4/1966 | Anderson et al. |
| 3,813,449 A | | 5/1974 | Hartwimmer et al. |
| 3,855,191 A | | 12/1974 | Doughty, Jr. et al. |
| 3,956,000 A | | 5/1976 | Kuhls et al. |
| 4,262,101 A | * | 4/1981 | Hartwimmer et al. ........ 526/89 |
| 4,360,618 A | | 11/1982 | Trementozzi |
| 4,487,902 A | * | 12/1984 | Fritschel ..................... 526/253 |
| 4,580,981 A | * | 4/1986 | Bannai et al. ............ 433/168.1 |
| 4,587,316 A | * | 5/1986 | Nakagawa et al. ......... 526/247 |
| 4,703,095 A | * | 10/1987 | Nakagawa et al. ......... 526/247 |
| 5,118,788 A | | 6/1992 | Hosokawa et al. |
| 5,405,923 A | | 4/1995 | Aten |
| 5,461,129 A | * | 10/1995 | Kurihara et al. ............ 526/247 |
| 5,641,571 A | | 6/1997 | Mayer et al. |
| 5,760,151 A | * | 6/1998 | Aten et al. .................. 526/247 |
| 5,973,091 A | * | 10/1999 | Schmiegel .................. 526/247 |
| 6,060,167 A | | 5/2000 | Morgan et al. |

FOREIGN PATENT DOCUMENTS

| | | |
|---|---|---|
| EP | 1 262 496 A1 | 12/2002 |
| JP | 51-41085 | 4/1976 |
| JP | 52-46993 | 11/1977 |
| JP | S57-22043 | 5/1982 |
| WO | WO 01/98384 A2 | 12/2001 |
| WO | WO-2004/050727 A1 * | 6/2004 |

* cited by examiner

*Primary Examiner*—David W. Wu
*Assistant Examiner*—Henry S. Hu

(57) ABSTRACT

A process for producing low molecular weight, granular polytetrafluoroethylene or modified polytetrafluoroethylene by suspension polymerization of pressurized tetrafluoroethylene in an agitated reaction vessel. The polymerization is conducted in aqueous medium in the presence of a free radical initiator, and a telogen. The reaction vessel is agitated during polymerization sufficiently to coagulate the polytetrafluoroethylene or modified polytetrafluoroethylene. Low molecular weight granular polytetrafluoroethylene or modified polytetrafluoroethylene having a melt viscosity of less than about $1 \times 10^6$ Pa·S powder is isolated directly from the reaction vessel. The low molecular weight polytetrafluoroethylene or modified polytetrafluoroethylene powder in accordance with the invention has a melt viscosity of less than about $1 \times 10^6$ Pa·S, a specific surface area of less than about 8 $m^2/g$, an extractable fluoride level of about 3 ppm or less by weight, and a narrow molecular weight distribution as indicated by a polydispersity index of about 5 or less. The particles of low molecular powder have a weight average particle size of about 2 to about 40 micrometers and the powder is substantially free of particles having a particle size of less than about 1 micrometer. The low molecular weight material so produced suitable for use as additives to other materials such as inks, coatings, greases, lubricants, and plastics.

31 Claims, No Drawings

DIRECTLY POLYMERIZED LOW MOLECULAR WEIGHT GRANULAR POLYTETRAFLUOROETHYLENE

FIELD OF THE INVENTION

This invention relates to low molecular weight granular polytetrafluoroethylene and modified polytetrafluoroethylene and a process for preparing the polymer directly by suspension polymerization.

BACKGROUND OF THE INVENTION

Low molecular weight polytetrafluoroethylene (PTFE) powders are widely used as additives to other materials such as inks, coatings, greases, lubricants, and plastics. These powders are currently produced either by direct polymerization or by degradation of high molecular weight PTFE powders through either high energy irradiation or thermal processes.

Direct polymerization has generally been accomplished by "dispersion" polymerization (also known as "emulsion" polymerization) wherein the polymer is produced as sub-micrometer colloidal particles, i.e., particles having a size less than 1 micrometer, in an aqueous latex. Dispersion polymerization of fluoropolymers often, but not always, employs a fluorinated surfactant for stabilization of the dispersion during polymerization. Dispersion polymerization can sometimes be carried out without surfactants if agitation is gentle and polymer solids are low (i.e., less than 20%). For example, Japanese patent publication (Kokoku) 57-22043 to Fumoto et al., discloses the preparation of low molecular weight PTFE with or without surfactant but calls for high levels of fluorine-containing telogen (fluoro- or chlorofluoro-alkanes) and achieves only low solids levels. In dispersion polymerization processes, the product latexes are coagulated subsequent to polymerization to afford agglomerated powders. The surfactants used to stabilize the dispersions are normally removed during isolation/drying. The powders are generally rather friable and may be deagglomerated upon application of shear back toward the original sub-micrometer primary particles. Such deagglomeration is especially prevalent if the powders are dispersed into a liquid having a low surface tension. These powders also typically have high surface areas such as 8–20 m$^2$/g.

The particle size of the low molecular weight PTFE powders is very important for some of its applications as an additive. For example, the preferred particle size for a coating or an ink print is typically slightly larger than the thickness of the coating or ink print. PTFE particles that protrude slightly through the coating layer increase the smudge or scuff resistance of printed inks. Such coatings or ink layers are typically 2–40 micrometers in thickness. Sub-micrometer particles such as those obtained from prior-art dispersion direct polymerization are too small to protrude through the coating or ink surface and cannot significantly aid in smudge resistance.

The high surface area of low molecular weight PTFE additive powders can increase the viscosity of the formulations into which it may be added. Although a high thickening powder is sometimes desirable, a minimal effect on formulation viscosity is at other times wanted. Again the high surface areas of the prior-art dispersion polymers may be a disadvantage.

Low molecular weight PTFE powders for uses, wherein a 2–40 micrometer particle size and/or a low surface area is preferred, have been produced typically from high molecular weight "suspension" polymerized PTFE (usually referred to as "granular" PTFE) by thermal degradation or by irradiation with high energy electrons from either a gamma source or electron beam. Granular PTFE can, after degradation of its molecular weight, be ground to the desired particle size for use in coatings and inks. Such powders typically have a much lower surface area (1.0–4.0 m$^2$/g) than polymer from emulsion or dispersion polymerization. However, these degradation processes are expensive and also generate hazardous byproducts, such as hydrogen fluoride.

It has also been attempted to change the particulate nature of low molecular weight dispersion polymerized PTFE powders to be more like powders produced by irradiating or thermally degrading high molecular weight PTFE. In U.S. Pat. No. 5,118,788 to Hosokawa et al., unsintered low molecular weight dispersion polymerized PTFE powder is heated to a temperature in range from about 70° C. lower than the melting point to a temperature lower than the melting point and comminuted. Such a process, however, is inherently difficult or impossible to control. As illustrated in the comparative examples of U.S. Pat. No. 5,118,788, a high temperature or long heating time will lead to poor comminuting properties and a low temperature or short heating time will not fuse all of the agglomerates and specific surface area will not be decreased. The powder isolated from a dispersion polymerization has a variety of agglomerate sizes and tightness of packing of the primary particles. This variation in the powder characteristics will cause variable agglomerate fusing at temperatures below the resin melting point. Incomplete fusing leads to the presence of friable agglomerates of primary dispersion particles, these agglomerates may deagglomerate to particles of less than 1 micrometer in size upon further processing such as mixing, grinding and the like.

A direct polymerization process for efficient production of low molecular weight PTFE powders suitable for use as additives to other materials is desired that can (1) minimize or eliminate the use of fluorosurfactants which are expensive and present a disposal problem after polymerization; (2) provide a powder substantially free of friable agglomerates of sub-micrometer primary particles; (3) provide a powder with a surface area less than 8 m$^2$/g; and/or (4) minimize or eliminate the need for polymer degradation processes.

BRIEF SUMMARY OF THE INVENTION

The invention provides for a process for producing low molecular weight, granular polytetrafluoroethylene or modified polytetrafluoroethylene by suspension polymerization of pressurized tetrafluoroethylene in an agitated reaction vessel. The polymerization is conducted in aqueous medium in the presence of a free radical initiator, and a telogen. The reaction vessel is agitated during polymerization sufficiently to produce coagulated, granular polytetrafluoroethylene or modified polytetrafluoroethylene. The low molecular weight granular polytetrafluoroethylene or modified polytetrafluoroethylene powder having a melt viscosity of less than about 1×10$^6$ Pa·S is isolated directly from the reaction vessel. In a preferred embodiment, the telogen is a non-fluorine containing organic compound, more preferably an aliphatic hydrocarbon or an aliphatic hydrochlorocarbon containing 1–6 carbon atoms. When polymerization is carried out by providing a precharge including tetrafluoroethylene and telogen in the reaction vessel and introducing additional tetrafluoroethylene to the reaction vessel as the polymerization proceeds, the telogen is preferably present in a concentration of about 0.5 mole % to about 20 mole %, more preferably about 0.5 mole % to about 10 mole %, and most preferably 0.5 mole % to about 5 mole % based upon total tetrafluoroethylene and telogen present in the precharge.

The invention further provides for low molecular weight polytetrafluoroethylene or modified polytetrafluoroethylene powder having a melt viscosity of less than about $1\times10^6$ Pa·S, a specific surface area of less than about 8 m$^2$/g, an extractable fluoride level of about 3 ppm or less by weight, and a narrow molecular weight distribution as indicated by a polydispersity index of about 5 or less. The particles of low molecular weight powder have a weight average particle size of about 2 to about 40 micrometers and the powder is substantially free of particles having a particle size of less than about 1 micrometer. In preferred embodiments, the low molecular powder has a melt viscosity in the range of about $1\times10^2$ Pa·S to about $1\times10^6$ Pa·S, a specific surface area of less than about 5 m$^2$/g, an extractable fluoride level of about 1 ppm or less by weight, and a polydispersity index of about 4.5 or less. In an especially preferred embodiment, the particles of the low molecular weight polymer powder of this invention have a D90/D10 particle size distribution ratio of about 2 to about 10.

DETAILED DESCRIPTION OF THE INVENTION

The invention provides a suspension polymerization process for production of low molecular weight polytetrafluoroethylene (PTFE) and modified PTFE powders that can be isolated directly from the reaction vessel. The low molecular weight powder so produced is suitable for use as an additive to other materials such as inks, coatings, greases, lubricants, and plastics.

Suspension Polymerization Process

The process of this invention can be carried out similarly to TFE suspension polymerizations known in the art for high molecular weight PTFE, involving the steps of precharging water to a stirred reaction vessel, deoxygenating, pressuring with TFE to a predetermined level, adding optional comonomer and adding free radical initiator at a sufficient level to start and to maintain the polymerization reaction. For this invention, low levels of telogen are also added, preferably to the precharge. TFE is introduced into the reaction vessel on a predetermined basis as the polymerization proceeds, for example to maintain a specified pressure or at a specified feed rate. Any workable pressure can be used in the process of this invention. High pressure offers an advantage over low pressure in increased reaction rate. Low pressure offers an advantage over higher pressure in increased comonomer incorporation. Generally, pressures in the range of about 0.3 to 7 MPa are used, and pressures in the range of 0.7 to 3.5 MPa are preferred. Pressures in the range of 0.7 to 2.5 MPa are more preferred, and pressures in the range of 0.7 to 1.9 MPa are especially preferred.

Suspension polymerizations commonly used for the production of high molecular weight PTFE powders in water have been typically carried out with little or no surfactant addition and with a high degree of agitation. Very small amounts of initiator are typically added so that a high molecular weight is maintained. The absence or limited amount of surfactant and the high shear of agitation causes the initially formed polymer to coagulate at an early stage in the polymerization and subsequent polymerization occurs on the solid particles in a gas-solid reaction in which water acts primarily as a heat transfer medium. The polymer particles typically are large and are "stringy" in nature. The appearance of the particles is believed to be partially due to the tendency of high molecular weight PTFE to cold-draw or fibrillate. The agglomeration and fibrillation result in low surface areas, commonly in the range of 1.0–4.0 m$^2$/g.

Prior to the present work, it has not been known whether low molecular weight PTFE powders with low surface areas could be polymerized at high solids levels by suspension polymerization. It was additionally not known what characteristics such polymer would have. Since it is believed that the molecular weight of PTFE must be high for fibrillation to play a role in the particle formation of suspension-polymerized PTFE, the particle morphology of low molecular weight PTFE produced by suspension polymerization was heretofore unknown. There was concern that polymer agglomeration of low molecular weight PTFE in the reaction vessel would be ineffective and that a significant amount of polymer would remain in the aqueous phase. Surprisingly, it has been found that with sufficient agitation low molecular weight, granular polytetrafluoroethylene or modified polytetrafluoroethylene having a melt viscosity of less than about $1\times10^6$ Pa·S can be isolated directly in high yield from the reaction vessel. In a preferred embodiment, the isolated low molecular weight polymer has a melt viscosity of in the range of about $1\times10^2$ Pa·S to about $1\times10^6$ Pa·S.

Similar to a standard suspension polymerization process such as that described in U.S. Pat. No. 3,245,972 to Anderson et al., it is believed that early in the process of the invention TFE dissolves in the water and polymerizes to form tiny solid water-wet nuclei. When the water-wet nuclei have increased sufficiently in size, they are coagulated by the agitation applied to the aqueous medium to form agglomerated non-water-wet particles. Further polymerization is believed to take place largely on the surface of the agglomerated non-water-wet particles at an increased rate, apparently via direct contact of gaseous monomer with the non-water-wet agglomerates in preference to contact with dissolved monomer with water-wet particles. However, significant differences from standard suspension polymerization include the addition of increased amounts of initiator as well as the addition of small amounts of telogen to achieve reduced molecular weight polymer.

As in the suspension polymerization of high molecular weight PTFE, the reaction vessel in this polymerization process is agitated sufficiently to coagulate the polytetrafluoroethylene or modified polytetrafluoroethylene. In a preferred embodiment the reaction vessel, the agitator is operated in a range of about 300 to about 800 rpm such as described in U.S. Pat. No. 5,405,923 to Aten. The agitation is sufficiently vigorous to smash the initially-formed particles together to create non-friable agglomerates of low surface area. Because the polymer coagulates during polymerization, isolation can be performed directly from aqueous medium. Moreover, as discussed in more detail below, there is not an excessive amount of telogen and thus no need for further washing of the product. All of this is in contrast to dispersion polymerization which product requires subsequent steps such as coagulation and washing to achieve isolation.

In a preferred embodiment of the invention, agitation is sufficient to cause coagulation of greater than 90% by weight of said low molecular weight polytetrafluoroethylene or modified polytetrafluoroethylene, more preferably greater than 95%, and most preferably greater than 98%. In the Examples of the invention which follow, it will be shown that the amount of solids remaining in the liquid phase is generally less than 2.0 wt. % and frequently less than 0.5 wt. %.

Also surprisingly, high productivity can be achieved by the present invention in that polymer solids levels prior to isolation of greater than 15% and preferably greater than 20% are attained.

In the production of modified PTFE, the fluorinated comonomer is preferably precharged and, optionally, continuously added in an amount sufficient to produce a copolymer of tetrafluoroethylene with preferably about 0.002 to about 0.20 mole % comonomer content.

The suspension polymerization process is conducted in the presence of low levels of telogen also known as a chain transfer agent (CTA). The term chain transfer implies the stopping of growth of one polymer chain and the initiation of growth of another such that the number of growing polymer radicals remains similar and the polymerization proceeds at a similar rate without the introduction of more initiator. However, in actual practice, the new radical formed by the reaction of the growing polymer chain with a CTA does not always initiate a new polymer chain. Thus, the number of polymer chain radicals and the reaction rate may be slowed without the addition of additional initiator. The key effect is that the produced polymer has a lower molecular weight than it would have had without the presence of the CTA.

The telogen used in the process of the present invention is preferably a non-fluorine-containing organic compound. The telogen can be defined as "active" in that the reaction requires relatively small amounts to achieve successful polymerization of the low molecular weight polymer. When polymerization is carried out by precharging a tetrafluoroethylene and telogen precharge to the reaction vessel and introducing additional tetrafluoroethylene as the polymerization proceeds, the telogen is preferably present in the precharge in a concentration of only about 0.5 mole % to about 20 mole %, more preferably about 0.5 mole % to about 10 mole %, and most preferably about 0.5 mole % to about 5 mole % based upon total tetrafluoroethylene and telogen present in the precharge.

In a more preferred embodiment of this invention, the telogen is selected from the group consisting of aliphatic hydrocarbons containing 1 to 6 carbon atoms and aliphatic hydrochlorocarbons containing 1 to 6 carbon atoms. In the most preferred embodiment, the telogen is an aliphatic hydrocarbon containing 1 to 6 carbon atoms. Examples of preferred telogens include chloroform and ethane.

In contrast to the efficiency of the telogen used in the present invention is the process described in JP Patent Publication (Kokoku) 57-22043 (Daikin) which employs a high level of fluorine-containing telogen (fluoro or chlorofluoro alkanes) to produce low molecular weight polymer powder in low yields. Examples in this publication describe a concentration of fluorine-containing telogen of from 30 to 80 mole %. Such large amounts of telogen imply that the reaction media is composed of multiple liquid phases: water plus a liquid telogen phase. Telogen present in such quantity reduces the efficiency of commercial production of the low molecular weight polymer resulting in either reduced output or requiring larger reaction vessels. High levels of telogen also require recovery of the telogen and washing of the product.

The suspension polymerization process of this invention is conducted preferably with a single liquid phase, i.e., aqueous medium. Water is convenient, liquid over a broad temperature range, inexpensive and safe.

In this reaction process for the production of low molecular weight polymer, a higher amount of initiator is employed than normally used for the standard polymerization of high molecular weight granular PTFE. Additional initiator aids in reducing the molecular weight and maintaining polymerization rate. The amount of initiator depends on the polymerization temperature and the initiator type but the amount used for our invention may be 3–20 times that used to achieve high molecular weight PTFE. Initiators that can be used in the practice of this invention include any free radical initiator for TFE polymerization that is effective over the temperature range to be employed. Initiators commonly employed in aqueous polymerization are thermally activated water-soluble free radical initiators such as ammonium persulfate (APS), potassium persulfate (KPS), or disuccinic acid peroxide, or combinations thereof, or chemically activated redox systems such as potassium permanganate/oxalic acid/potassium bisulfite, potassium persulfate/potassium bisulfite/iron sulfate, or potassium bromate/potassium bisulfite/oxalic acid and the like.

The process of the present invention is preferably carried so that the contents of the reaction vessel are essentially free of surfactant, i.e., the amount of surfactant is less than 0.010% based on the amount of water present. The use of fluorosurfactants adds expense and presents a disposal problem after polymerization. Further, the addition of surfactant to the reaction media tends to produce an undesired increase in the specific surface area of the polymer and leads to reduced amounts of coagulated polymer and increased polymer loss. In preferred embodiments, the process of this invention produces low molecular weight powder having a specific surface area of less than about 8 $m^2/g$, more preferably less than about 5 $m^2/g$, even more preferably less than about 4 $m^2/g$, and most preferably in the range of about 1 $m^2/g$ to about 4 $m^2/g$.

The process of the present invention is preferably carried out without irradiation thereby producing low molecular weight polymer having an extractable fluoride level of about 3 ppm or less by weight and, preferably, an extractable fluoride level of about 1 ppm or less by weight. The invention eliminates the need for costly degradation processes that can generate hazardous byproducts.

The process of this invention preferably produces particles of low molecular weight polymer powder having a weight average particle size of about 2 to about 40 micrometers and the powder is preferably substantially free of particles having a particle size of less than about 1 micrometer. In addition, it is preferred for the process to produce powder substantially free of friable agglomerates of sub-micrometer primary particles. In another embodiment, it may be useful to further reduce size of the particles of a polymer formed by the process of this invention by grinding. The powder so processed remains substantially free of particles having a size of less than one micrometer thus evidencing the lack of friable agglomerates produced during polymerization.

In a preferred embodiment, the process produces low molecular weight polymer with a narrow molecular weight distribution as indicated by a polydispersity index of about 5 or less, preferably of about 4.5 or less, more preferably of about 4 or less.

The process of this invention efficiently produces by direct polymerization low molecular weight PTFE or modified PTFE and minimizes or eliminates the use of fluorosurfactants while minimizing or eliminating the need for polymer degradation processes. The product is substantially free of sub-micrometer primary particles and friable agglomerates of such particles and provides a powder with particles having a relatively large average particle size, a low specific surface area and narrow particle size distribution which are particularly useful as additives in selected applications as discussed below.

Low Molecular Weight Polymer Product

The low molecular weight polymers made in accordance with the present invention are polytetrafluoroethylene (PTFE) homopolymer and modified PTFE. Modified PTFE is a copolymer of tetrafluoroethylene with one or more fluorinated, preferably perfluorinated monomers, such as olefins having from 3 to 6 carbon atoms, such as hexafluoropropylene, and perfluoro(alkyl vinyl ether) (PAVE) wherein the alkyl group contains 1 to 5 carbon atoms. A preferred perfluoro(alkyl vinyl ether) is perfluoro(propyl vinyl ether) (PPVE). Also preferred is the partially fluorinated monomer, perfluorobutyl ethylene (PFBE). The comonomer present in the tetrafluoroethylene polymer is preferably a relatively small amount; e.g., about 0.002 to about 0.20 mole % of comonomer. The low molecular weight fluorocarbon polymer will generally have a first melting peak temperature of less than 340° C., preferably less than 335° C., more preferably less than 330° C. and most preferably about 315° C. to about 335° C. as measured by ASTM D4591-87.

The low molecular weight polymer of this invention has a melt viscosity of less than about $1 \times 10^6$ Pa·S, preferably in the range of about $1 \times 10^2$ Pa·S to about $1 \times 10^6$ Pa·S. In some applications such as when these low molecular weight fluoropolymer powders are used as additives to plastics, a range of about $1 \times 10^4$ Pa·S to about $1 \times 10^5$ Pa·S is desirable. In other applications such as when the low molecular weight fluoropolymer powders are used as additives to inks, a range of about $1 \times 10^2$ Pa·S to about $1 \times 10^3$ Pa·S is desirable. Product melt viscosities are determined using essentially the method of ASTM D-1238-52T, modified as disclosed in U.S. Pat. No. 4,360,618 and further explained below in the section describing test methods.

The low molecular weight polymer of this invention has a specific surface area of less than about 8 $m^2/g$, preferably less than about 5 $m^2/g$, more preferably less than about 4 $m^2/g$ and most preferably about 1 $m^2/g$ to about 4 $m^2/g$. Specific surface area (SSA) is measured according to the method of ASTM-5675.

The low molecular weight polymer of this invention has an extractable fluoride level of about 3 ppm or less by weight and preferably an extractable fluoride level of about 1 ppm or less by weight. The procedure for determining extractable fluoride content is explained below in the section describing test methods.

The low molecular weight polymer powder of this invention has a narrow molecular weight distribution as indicated by a polydispersity index of about 5 or less, preferably of about 4.5 or less, more preferably of about 4 or less. The procedure for determining the molecular weight distribution is explained below in the section describing test methods. The narrow molecular weight distribution of the polymer of the invention provides improved surface characteristics when the low molecular weight powder is used as an additive to plastics for molding and extrusion operations. Surface imperfections and bubble formation in parts made of such plastic compounds are significantly reduced by minimizing additive material with substantially lower molecular weight.

The particles of low molecular weight polymer powder have a weight average particle size of about 2 to about 40 micrometers and the powder is substantially free of particles having a particle size of less than about 1 micrometer. Preferably, the powder is free of friable agglomerates of sub-micrometer primary particles. Average particle sizes are measured on alcohol suspensions of the product powders using a laser light scattering technique (Microtrac model 9200 analyzer) per ASTM specification D 5675-95a. The presence of sub-micrometer particles can sometimes be seen via the laser light scattering technique but this can depend on the sample preparation method. The preferred method to determine their presence is to employ scanning electron microscopic analysis of the powders dispersed in a fluid of low surface tension.

Preferably, the particles of low molecular weight polymer powder of this invention have a D90/D10 particle size distribution ratio of about 2 to about 10. The particle size distribution ratio is calculated as the ratio of the D90 particle size (90% of the particles are smaller than this value) to the D10 particle size (10% of the particles are smaller than this value).

The average powder particle size and its size distribution are very important for use of these powders as additives to other materials for example such as in printing inks and plastics. The PTFE powder is added to inks to provide scuff resistance to prints and prevent printed pages from sticking to one another. The optimum particle size for printing inks is generally slightly larger than the expected print thickness to aid in scuff resistance. Particles that are substantially larger than the print thickness can appear as grit or cause scratches in the print surface whereas smaller particles sink to the bottom of the print, where they become ineffective.

PTFE powders are added to plastics to enhance their wear performance, lubricity, and coefficient of friction. The optimum particle size for use in plastics is generally larger than that for use in printing inks but size distribution is again important. The PTFE particle size should be large enough to be sufficiently imbedded in the plastic part surface to avoid removal during abrasion or scuffing but not so large that they provide sites for mechanical failure or visual defects. Particles that are "too small" can more easily be removed from the plastic part surface by abrasion and should be minimized.

Use

Low molecular weight polytetrafluoroethylene (PTFE) or modified PTFE can be advantageously used as an additive in other materials for improving sliding properties, increasing release, improving wear resistance, conferring increased stain and mar resistance, enhancing flame retardancy, and increasing water repellency. These low molecular weight powders are advantageously added to inks, paints, coatings, lacquers, greases, oils, lubricants, thermoplastics, thermoset resins, and elastomers. As discussed above, the powders of this invention are especially useful as additives to ink compositions and plastic compositions (especially engineering plastics) where larger average particle size and narrow particle size distribution are important. Such powder is added to inks to provide scuff resistance and to prevent printed pages from adhering to one another. These low molecular weight powders are added to plastics to enhance wear performance, lubricity, and coefficient of friction.

TEST METHODS

Particle Size is determined by measuring alcohol suspensions of the product powders using a laser light scattering technique (Microtrac model 9200 analyzer) per ASTM specification D 5675-95a. This technique reports results as percent volume distribution calculated as equivalent spherical diameter. This is same as percent weight distribution since all particles have the same density. The weight average, D10, and D90 particle size are automatically determined from the distribution by the instrument. This equipment and technique may also show the presence or absence of sub-micrometer particles.

D90/D10 Particle Size Distribution Ratio is calculated as the ratio of the D90 particle size (90% of the particles are smaller than this value) to the D10 particle size (10% of the particles are smaller than this value).

The presence of sub-micrometer particles may be noted by the laser light scattering method described above. A preferred method for determination of sub-micrometer particles is scanning electron microscopy of powder after ultrasonic-aided (ultrasonic bath or probe) dispersion in a fluid of low surface energy such as FREON® 113 or VERTREL® XF followed by deposition on a silicon wafer.

Melt Viscosity is determined using essentially the method of ASTM D-1238-52T, modified as disclosed in U.S. Pat. No. 4,360,618, except that a load of either 5000 or 10,000 grams may be used. A melt density of 1.50 g/cc is assumed and the melt viscosity (in Pa·S) is calculated as either 3691 or 7344 (depending on whether 5000 or 9940 g weight is applied) divided by the observed extrusion rate in g/minute.

Specific Surface Area (SSA) is measured according to the method of ASTM-5675.

Extractable Fluoride Content

This test measures the fluoride present in the polymer prior to testing and the fluoride produced during the test by decomposition of unstable end groups in the polymer. Ten grams of sample to be tested are placed in a polyethylene bottle. Ten milliliters of a 1:1 mixture (by volume) of methanol/water are added and 10 mL of a Orion 94-09-09 Total Ionic Strength Adjusting Buffer (normally used in fluoride specific ion measurements) are added. The methanol portion of the mixture is necessary to speed the extraction. The mixture is agitated briefly and allowed to stand for 18 hours. Fluoride concentration is determined directly on the sample mixture, using an appropriately calibrated specific ion electrode (Orion 96-90-00). Calibration in the range of 0.05 to 50 micrograms fluoride per milliliter of extracting solution is appropriate to analyze concentrations in the range 0.1 to 100 ppm.

Polydispersity Index

The polydispersity index is a measure of the molecular weight distribution ($M_w/M_n$) of a polymer as determined from rheology data. Samples in powder form are individually piston pressed at 370° C. into a 25 mm-diameter disc, ~2–3 mm thick. Sample testing is performed on a ARES Rheometer (Advanced Rheometric Expansion System) manufactured by Rheometrics Scientific of Piscataway, N.J. (presently owned by Waters Corporation) using 25 mm parallel plates. All test data are generated using Rheometrics Scientific Orchestrator Software, namely the dynamic frequency sweep test and the "Molecular Weight Distribution Synthesis Function" software. Frequency sweep test parameters used are: temperature: 370° C., strain rate: 2%, frequency range of 0.01 to 100 rad/s. The resulting data from the frequency sweep are then analyzed using the MWD Synthesis Function based on PTFE material properties and an estimation of MWD to determine the weight-average ($M_w$) and polydispersity index ($M_w/M_n$) of the lots. (Viscosity Exponent 3.4; Activation Energy 0; Plateau Modulus $1.7 \times 10^6$; Reference Temp 370° C.; Front Factor $2.15 \times 10^{-17}$ Entanglement $M_w$ 4800, Minimum Reptation Wt 9600.) MWD Synthesis Function requires an initial estimation of MWD and then converges upon a solution by minimizing the difference between the data and a curve fit ("fit error"). Initial estimation of MWD is first determined using a unimodal fit then followed by a bimodal fit estimating the 2nd faction two or three times higher than the first estimation. Accepted data is taken based upon the lowest possible solution error.

EXAMPLES

All polymerizations are carried out in a stainless steel autoclave, capable of holding 83.5 lbs (38 kg) of water, encased in a jacket through which heat-transfer fluid is circulated. The autoclave is equipped with a two-bladed, 45 degree angled flat downdraft agitator mounted on a vertical shaft. The temperature in the vapor space is measured by a thermocouple in a small well near the top of the autoclave. Many of the details of the polymerizations are summarized in Table I. The water charge is 47.0 lbs (21.4 kg) and the APS initiator is dissolved in an additional 0.7 to 1.3 lbs (0.3 to 0.6 kg) of water. The autoclave is purged of air by alternately pressuring it with TFE and evacuating. After three purges, a vacuum is left on the autoclave and the telogen, i.e., chain transfer agent (CTA) is added. The CTA concentrations in Table 1 are expressed as the mole % of gas at the beginning of polymerization. The autoclave contents are heated to 65° C. and the autoclave is then pressured to 1.83 MPa with TFE. The agitator speed is turned to 600 rpm and held there for the remainder of the polymerization. The initiator solution is pumped into the autoclave and kickoff (a 0.07 MPa drop in pressure) occurs within several minutes. TFE is then added to maintain the 1.83 MPa pressure. After the addition of 14–15 lbs (6.4–6.8 kg) of TFE, addition is stopped but the reaction is generally allowed to continue for an additional time period during which time the autoclave pressure drops. Finally, the agitator is stopped, cooling water is added to the autoclave jacket, and the reactor is vented. The polymer product, which is floating on the water in the autoclave, is then scooped from the autoclave and the water effluent is analyzed for suspended polymer. The polymer is dried in an oven at 150° C. The product data that are shown in Table 1 are of the powders after polymerization and drying, without cutting or grinding. However, the polymer can be cut or ground to a smaller particle size if so desired. The water phase from polymerization is analyzed to determine the amount of polymer that did not coagulate during polymerization. Melting points for the powder of Examples 3, 4, 5 and 8, 10, and 11 are determined in accordance with ASTM D4591-87. For each of these powders, the first and second melting peak temperatures are shown in Table 1.

The dried powders of Example 3 and 4 are subjected to the rheological procedure discussed above to determine the polydispersity index ($M_w/M_n$). Powder of Example 3 has a polydispersity of 3.15 and powder of Example 4 has a polydispersity of 3.59. In comparison low molecular weight PTFE powder commercially available as ZONYL® MP1300 (DuPont Company, Wilmington, Del.), produced by degradation of high molecular weight PTFE granular using irradiation, when subjected to the same measurement procedure has a polydispersity of 5.5. A high polydispersity index implies the presence of a fraction of low or high molecular weight resin that could cause processing problems during compounding into another material.

The dried powders of Examples 2, 7 and 9 are subjected to the procedure described above for determining extractable fluoride content. Powder of Examples 2, 7 and 9 are determined to have a very low extractable fluoride content, respectively, of 0.56 ppm, 0.61 ppm and 0.58. For comparison, samples of commercially available irradiated PTFE powders, ZONYL® MP1200 and MP1300 (DuPont Company, Wilmington, Del.), are analyzed for their fluoride content. Their respective fluoride levels are 53 and 25 ppm.

The dried powders of Examples 5 and 6 are ground using an 8 inch Vortac air-jet mill (manufactured by Churchmen's Machine Company, Wilmington, Del.) with an air temperature of 24° C. and a nozzle pressure of 100 psig. The ground powder of Example 5 has an average particle size of 7.06 micrometers and a D90/D10 particle size distribution ratio of 3.22.

There are no detectable particles less than about 2.3 micrometers or larger than 27 micrometers in size. The ground powder of Example 6 has an average particle size of 2.6 micrometers and a D90/D10 particle size distribution ratio of 3.57. There are no particles smaller than 1.0 micrometer or larger than 13 micrometers. By comparison, ZONYL® MP1100 PTFE powder (DuPont Company, Wilmington, Del.), which is produced by irradiation and grinding of high molecular weight PTFE dispersion polymer, typically has an average particle size of about 4 micrometers but also typically contains 1–6% of sub-micrometer particles (by laser light scattering analysis). Also by comparison, ZONYL® MP 1600 PTFE powder (DuPont Company, Wilmington, Del.), which is produced by isolation and drying of polymer produced by aqueous dispersion polymerization in the presence of a telogen, show the presence of sub-micrometer particles by laser light scattering. SEM analysis of MP 1100 and MP 1600 powders also shows the presence of numerous sub-micrometer particles.

Incorporation of Ground PTFE Powder into Printing Ink

The ground PTFE powder of Example 6 is suspended at a 2% loading in a wax-free red ink base and the ink is then drawn down on a standard paper stock side-by-side with an ink that did not contain the PTFE. After drying at 350° F., the prints are rubbed by a GA-C.A.T (Comprehensive Abrasion Tester, available from Gavarti Associates of Milwaukee, Wis.) against an abrasive receptor (ASTM method D 5181) for 120 seconds and the prints are compared. The print that did not contain the PTFE shows considerably more scratches and wear than does the print that contained the PTFE. The receptor paper against the print that contained the PTFE shows very little ink transfer in comparison to the control without PTFE. Comparisons are also made with the use of ZONYL® MP1 100 (irradiation-degraded high molecular weight dispersion polymer) and a low molecular weight PTFE powder that has been polymerized by the dispersion process of U.S. Pat. No. 6,060,167 to Morgan et al. They afford improved wear performance compared to the absence of any PTFE but show considerably more wear than the additive of this invention.

Incorporation of Ground PTFE Powder into Polyacetal Resin

Portions of powders from Examples 10 and 11 are combined and ground using an 8 inch "Microjet" air mill manufactured by Fluid Energy Processing and Equipment Company of Hatfield, Pa. The ground powder has an average particle size of 10.6 micrometers as determined by laser light scattering technique (Microtrac model 9200 analyzer) and a D90/D10 ratio of 5.08. It contains no particles smaller than 3 micrometers and no particles larger than 88 micrometers by laser light scattering. SEM analysis showed almost no particles less than one micrometer in diameter. The ground powder is tumbled with DELRIN® 500P polyacetal powder (available from DuPont Company, Wilmington Del.) at a 20% loading and the mixture is then extruded through a single-screw extruder. The extrudate is cut into pellets, a portion of which are molded into thrust washers using a Arburg 1.5 oz. injection molding machine. The wear performance of this blend against a NYLATRON® surface is compared with a standard sample of DELRIN® 500P (DuPont) that contained no PTFE using a model LRI-1A Wear Test Machine manufactured by Lewis Research, Inc. of Lewes, Del. The coefficient of friction of the control and the sample containing 20% of the PTFE of our invention are 0.39 and 0.17, respectively. The steady-state wear rates are 0.8933 and 0.0017 mil/min, respectively. The addition of the low molecular weight powder of this invention enhances the wear performance, lubricity and coefficient of friction of plastic parts to which the powder is added.

TABLE 1

| Example Number | CTA Type | CTA Level mole % | APS Initiator lbs | C-8† Surfactant lbs | TFE Added lbs | Reaction Time*** minutes | Pressure Before Vent MPa |
|---|---|---|---|---|---|---|---|
| 1 | CHCl$_3$ | 2.0 | 0.013 | None | 14.3 | 128/22 | 0.40 |
| 2 | " | 3.5 | 0.019 | " | 15.9 | 132/15 | 0.29 |
| 3 | ethane | 2.2 | 0.033 | " | 14.1 | 82/33 | 0.18 |
| 4 | " | 5.4 | 0.053 | " | 14.1 | 73/38 | 0.16 |
| 5 | " | 5.3 | 0.066 | 0.0048 | 15.9 | 117/15 | 0.39 |
| 6 | " | 6.3 | " | None | 15.9 | 83/31 | 0.19 |
| 7 | " | 7.8 | 0.066 | " | 15.2 | 88/26 | 0.16 |
| 8* | " | 3.1 | 0.033 | " | 14.1 | 98/15 | 0.16 |
| 9** | " | 4.4 | 0.066 | " | 13.0 | 70/— | 1.83 |
| 10 | " | 0.33 | 0.010 | " | 14.1 | 63/24 | 0.16 |
| 11 | " | 0.55 | 0.013 | " | 14.1 | 74/24 | 0.16 |

| Example Number | Polymer in H$_2$O Phase % | Polymer Melt Viscosity Pa·S | SSA m$^2$/g | Particle Size Avg. μm | Particle Size D90/D10 | No Particles <Than μm | No Particles >Than μm | DSC Melting Point ° C. |
|---|---|---|---|---|---|---|---|---|

TABLE 1-continued

| | | | | | | | | |
|---|---|---|---|---|---|---|---|---|
| 1 | 1.10 | 7.1 × 10³ | 3.58 | 24.9 | 5.37 | 6 | 125 | |
| 2 | 1.09 | 3.8 × 10⁴ | 4.24 | 21.7 | 6.03 | 6 | 148 | |
| 3 | 0.44 | 1.3 × 10⁵ | 4.35 | 36.7 | 6.34 | 7 | 296 | 327/329 |
| 4 | 0.65 | 7.9 × 10³ | — | 25.0 | 6.30 | 6 | 148 | 327/329 |
| 5 | 5.47 | 2.0 × 10³ | 4.99 | 12.7 | 6.38 | 3 | 105 | 327/328 |
| 6 | 0.24 | 2.1 × 10³ | 3.35 | 18.9 | 7.97 | 3 | 176 | |
| 7 | 0.48 | 3.6 × 10³ | 2.95 | 22.3 | 7.44 | 4 | 176 | |
| 8* | — | 2.4 × 10⁴ | — | 32.8 | 6.39 | 6 | 176 | |
| 9** | — | 9.1 × 10² | 4.01 | 17.7 | 6.58 | 3 | 105 | |
| 10**** | 0.22 | NA | 4.49 | 830 | 2.69 | 192 | 1535 | 332/330 |
| 11**** | 0.12 | NA | 4.40 | 649 | 2.93 | 161 | 1535 | 331/331 |

†C8 surfactant is perfluorooctanoic acid.
*PFBE is added to this polymerization; 12.3 grams to the precharge followed by a constant addition of 0.145 grams/minute for 93 minutes during polymerization.
**PPVE is added to this polymerization; 24.5 grams to the precharge followed by a constant addition of 0.23 grams/minute for 64 minutes during polymerization.
***Reaction time is expressed as two values; the first is the reaction time at 1.83 MPa (250 psig), maintained by TFE addition, and the second value is the time after TFE addition is stopped and the pressure is allowed to drop (with reaction continuing) until venting. The next column in the table lists the final pressure before reactor venting.
****Particle size analyzed on a Microtrac Model SRA200 Analyzer as dry powders

What is claimed is:

1. A process for producing low molecular weight, granular polytetrafluoroethylene or modified polytetrafluoroethylene having a melt viscosity of less than about 1×10⁶ Pa·S in a suspension polymerization process comprising polymerizing pressurized tetrafluoroethylene in an agitated reaction vessel which contains aqueous medium, free radical initiator, and a telogen; agitating the contents of said reaction vessel during polymerization sufficiently to coagulate polytetrafluoroethylene or modified polytetrafluoroethylene; and isolating said granular polytetrafluoroethylene or modified polytetrafluoroethylene having a melt viscosity of less than about 1×10⁶ Pa·S directly from said reaction vessel, said modified polytetrafluoroethylene having about 0.002 to about 0.20 mole % of comonomer.

2. The process of claim 1 wherein said agitation of said contents of said reaction vessel is sufficient to coagulate greater than 90% by weight of said low molecular weight polytetrafluoroethylene or modified polytetrafluoroethylene.

3. The process of claim 1 wherein said agitation of said contents of said reaction vessel is sufficient to coagulate greater than 95% by weight of said low molecular weight polytetrafluoroethylene or modified polytetrafluoroethylene.

4. The process of claim 1 wherein said agitation of said contents of said reaction vessel is sufficient to coagulate greater than 98% by weight of said low molecular weight polytetrafluoroethylene or modified polytetrafluoroethylene.

5. The process of claim 1 wherein said contents of said reaction vessel comprises surfactant in an amount less than 0.010% based on the amount of water present.

6. The process of claim 1 wherein prior to isolation said contents of said reaction vessel has a polymer solids level of greater than 15%.

7. The process of claim 1 wherein prior to isolation said contents of said reaction vessel has a polymer solids level of greater than 20%.

8. The process of claim 1 wherein said low molecular weight polytetrafluoroethylene or modified polytetrafluoroethylene is produced without irradiation.

9. The process of claim 1 wherein said telogen comprises a non-fluorine-containing organic compound.

10. The process of claim 1 wherein said telogen is selected from the group consisting of aliphatic hydrocarbons containing 1 to 6 carbon atoms and aliphatic hydrochlorocarbons containing 1 to 6 carbon atoms.

11. The process of claim 10 wherein said telogen is an aliphatic hydrocarbon containing 1 to 6 carbon atoms.

12. The process of claim 1 wherein said polymerizing is carried out by providing a precharge comprising tetrafluoroethylene and telogen in said reaction vessel and introducing additional tetrafluoroethylene to said reaction vessel as said polymerizing proceeds, said telogen being present in a concentration of about 0.5 mole % to about 20 mole % based upon total tetrafluoroethylene and telogen present in said precharge.

13. The process of claim 1 wherein said polymerizing is carried out by providing a precharge comprising tetrafluoroethylene and telogen in said reaction vessel and introducing additional tetrafluoroethylene to said reaction vessel as said polymerizing proceeds, said telogen being present in a concentration of about 0.5 mole % to about 10 mole % based upon total tetrafluoroethylene and telogen present in said precharge.

14. The process of claim 1 wherein said polymerizing is carried out by providing a precharge comprising tetrafluoroethylene and telogen in said reaction vessel and introducing additional tetrafluoroethylene to said reaction vessel as said polymerizing proceeds, said telogen being present in a concentration of about 0.5 mole % to about 5 mole % based upon total tetrafluoroethylene and telogen present in said precharge.

15. The process of claim 1 wherein said polytetrafluoroethylene or modified polytetrafluoroethylene has a melt viscosity in the range of about 1×10² Pa·S to about 1×10⁶ Pa·S.

16. The process of claim 1 further comprising grinding said granular polytetrafluoroethylene or modified polytetrafluoroethylene.

17. A low molecular weight powder of polytetrafluoroethylene or modified polytetrafluoroethylene produced by the process of claim 1.

18. A low molecular weight powder of polytetrafluoroethylene or modified polytetrafluoroethylene produced by the process of claim 16.

19. The low molecular weight powder of claim 17 having a specific surface area of less than about 8 m²/g.

20. The low molecular weight powder of claim 17 having a specific surface area of less than about 5 m²/g.

21. The low molecular weight powder of claim 17 having a specific surface area of less than about 4 m²/g.

22. The low molecular weight powder of claim 17 having a specific surface area of about 1 m²/g to about 4 m²/g.

23. The low molecular weight powder of claim 17 wherein the particles of said low molecular powder have a weight average particle size of about 2 to about 40 micrometers and the powder is free of particles having a particle size of less than about 1 micrometer.

24. The low molecular weight powder of claim 23 wherein said particles have a D90/D10 particle size distribution ratio of about 2 to about 10.

25. The tow molecular weight powder of claim 17 having an extractable fluoride level of 3 ppm or less by weight.

26. The low molecular weight powder of claim 17 having an extractable fluoride level of 1 ppm or less by weight.

27. The low molecular weight powder of claim 17 having a polydispersity index of about 5 or less.

28. The low molecular weight powder of claim 17 having a polydispersity index of about 4.5 or less.

29. The low molecular weight powder of claim 17 having a polydispersity index of about 4 or less.

30. An additive to ink compositions comprising a low molecular weight powder of polytetrafluoroethylene or modified polytetrafluoroethylene produced by the process of claim 1.

31. An additive to plastic compositions comprising a low molecular weight powder of polytetrafluoroethylene or modified polytetrafluoroethylene produced by the process of claim 1.

* * * * *